Nov. 12, 1935.  R. DIETZE  2,021,000

HIGH VOLTAGE GENERATOR

Filed Aug. 18, 1932

Inventor:
Richard Dietze,
by Charles E. Mullen
His Attorney.

Patented Nov. 12, 1935

2,021,000

UNITED STATES PATENT OFFICE 2,021,000

HIGH VOLTAGE GENERATOR

Richard Dietze, Berlin-Pankow, Germany, assignor to General Electric Company, a corporation of New York Application August 18, 1932, Serial No. 629,330
In Germany September 30, 1931

3 Claims. (Cl. 171—252)

My invention relates to electrical testing devices and concerns particularly testing-current generators for line and insulation testing and measuring devices.

My invention has for its principal object the provision of a simple, easily operated portable resistance and circuit testing device to be driven by hand, if desired, in which the reliability is increased by overcoming the necessity for insulating the generator for high voltages and in which the winding space of the generator is utilized to the best advantage with active conductor material.

A further object is to provide an arrangement which may be used for testing with either alternating or direct currents and with which tests at different voltages may readily be made. Other objects and advantages will become apparent as the description proceeds.

In accordance with my invention in its preferred form I utilize an alternating-current generator having an armature wound with relatively few turns and producing a relatively low voltage so as to overcome insulation difficulties and to permit the best utilization of the winding space of the armature. The generator may be driven in any desired manner. Preferably for the sake of convenience and portability it is arranged to be driven by a hand crank. The generator shaft also carries slip rings and a commutator. The generator armature is connected through slip rings to the primary of a step-up transformer, the secondary of which is connected to slip rings and a commutator so as to supply a rectified current at the relatively high voltage required for testing insulation or for similar tests. Although I prefer to use a commutator for rectification it will be understood that I am not limited to any specific means of converting the high voltage alternating current into direct current. By utilizing a transformer having a plurality of secondary windings and by utilizing a plurality of commutators or other rectifier devices, I may obtain an arrangement in which the plurality of different testing voltages may be obtained from different taps. The features of my invention which I believe to be novel and patentable will be pointed out in the claims appended hereto.

Figure 1:
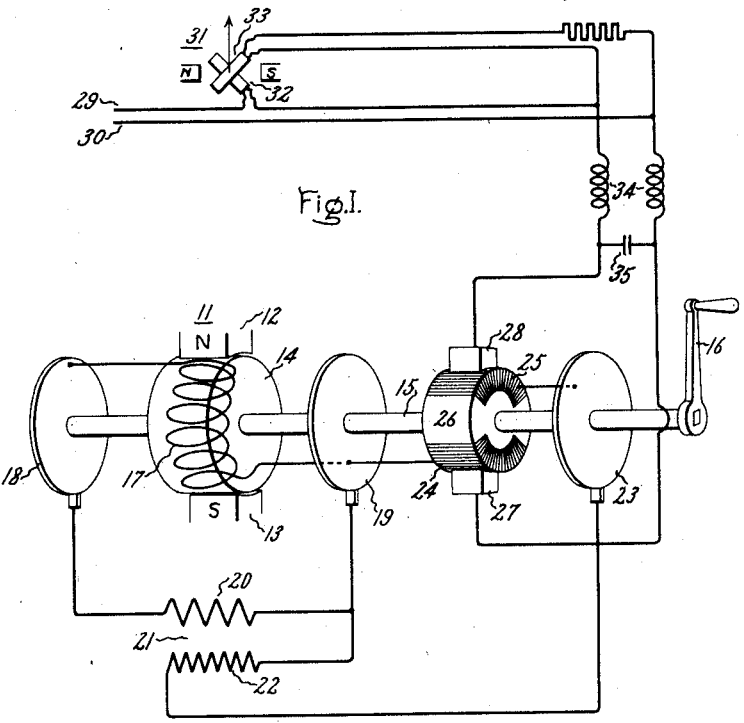
Figure 2:
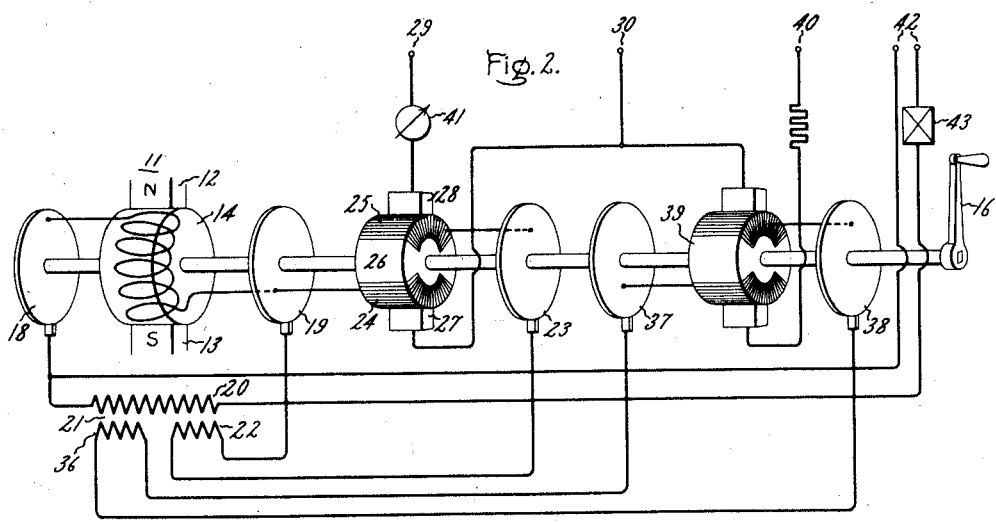

For a more complete understanding of my invention, reference may be had to the following description taken in connection with the accompanying drawing in which Fig. 1 represents one embodiment of my invention and in which Fig. 2 represents a modification in which alternating current as well as direct current at different voltages may be obtained.

Referring now more in detail to the drawings, in which like reference characters refer to like parts throughout, a generator 11 is provided having any suitable type of field structure represented by the field poles 12 and 13 and having a rotating armature 14. The armature 14 is carried by a shaft 15 to which is connected a crank 16. The armature 14 carries a winding indicated schematically at 17 having relatively few turns designed for low voltage. The winding 17 is connected by means of slip rings 18 and 19 to the primary winding 20 of a step-up transformer 21. The transformer 21 has a relatively high voltage secondary 22 connected through brushes to the slip rings 19 and 23. The slip rings 19 and 23 are connected to segments 24 and 25 respectively of a commutator 26. A direct current of relatively high voltage suitable for insulation testing or the like is drawn from the commutator 26 by means of brushes 27 and 28. The test voltage is supplied to the apparatus to be tested through the leads 29 and 30.

Suitable means are provided for indicating or measuring the amount of current supplied to the tested apparatus or the resistance of the apparatus to be tested. The current responsive means may, for example, take the form of an ohmmeter 31 having the current winding 32 and the potential winding 33, but it will be understood that I am not limited to any specific form of indicating or other current-responsive device. If desired, the apparatus may be so arranged that voltage variations and fluctuations in torque are smoothed out, for example, by utilizing a plurality of commutators and armatures with their magnetic axes staggered, by utilizing a suitable filter in the electrical circuit or by combining both expedients. If an electrical filter is employed, it may take any suitable form comprising, for example, choke coil 34 and/or a condenser 35 which serve to oppose or absorb variations in the voltage drawn from the commutator 26.

In Fig. 2 is illustrated an arrangement utilizing a transformer having a pair of secondary windings and utilizing a pair of commutators. The transformer 21 is provided with an additional secondary winding 36 connected through slip rings 37 and 38 and commutator 39 to supply direct current to the terminals 30 and 40. With this arrangement different voltages for testing circuits having different characteristics may be obtained by making connections between any two of the terminals 29, 30 and 40. A current-responsive device 41, here shown connected in line 29, may be calibrated to indicate the magnitude of the quantities to be measured. It will be understood that change-over switches might also be arranged to permit the use of only one commutator or to permit switching the circuit to be tested from one voltage to another without making any changes in connections. The relative numbers of turns of the secondary windings 22 and 36 may be so selected, if desired, that a relatively low voltage is obtained between terminals 29 and 30 for the purpose of line testing, for example, and a relatively high voltage is obtained between terminals 29 and 40 for insulation testing. It will be understood that in this case the transformer need not necessarily be a step-up transformer with respect to both secondary windings.

My apparatus may also readily be arranged so as to provide a relatively low alternating-current voltage at the terminals 42, connected directly to slip rings 18 and 19, for the purpose of testing the continuity of electrical circuits, for example, by means of an alternating-current buzzer 43.

In accordance with the provisions of the Patent Statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A device for producing high-voltage direct current comprising in combination an alternating-current generator wound for relatively low voltage, means for driving said generator, a commutator and 3 slip rings mechanically connected to said generator and brushes co-operating therewith, the first and second of said slip rings being electrically connected to said generator and a step-up transformer having a primary winding fed by said generator through the brushes engaging said first and second slip rings and a secondary winding supplying a relatively high voltage and connected to the brushes engaging the second and third of said slip rings, said commutator having segments connected to the second and third of said slip rings respectively, the pair of brushes engaging said commutator supplying rectified current at a relatively high voltage.

2. In a device for testing electical apparatus with direct current at relatively high voltage, means for supplying testing current comprising an alternating-current generator wound for relatively low voltage, a crank for driving said generator, a commutator, 3 sliprings and brushes co-operating therewith, the first and second of said slip rings being electrically connected to said generator a step-up transformer having a primary winding fed by said generator through the brushes engaging said first and second slip rings and a secondary winding wound for relatively high voltage and connected to the brushes engaging the second and third of said slip rings, and a shaft mechanically connecting said generator, slip rings and commutator, said commutator having segments connected to said second and third slip rings, the pair of brushes engaging said commutator supplying rectified current at a relatively high voltage to the apparatus to be tested.

3. A device for producing high voltage, substantially continuous, direct current which comprises an alternating current generator having a low voltage rotating armature winding, a rotating shaft carrying said rotating winding, a pair of slip rings mounted upon said shaft and connected to said armature winding, a third slip ring mounted on said shaft, and a commutator mounted on said shaft comprising a pair of insulating segments and a pair of conducting segments alternately positioned around the periphery of said commutator, a step-up transformer having primary and secondary windings, and brushes cooperating with said slip rings and said commutator, the primary winding of said transformer being connected to the brushes co-operating with said first mentioned pair of slip rings, the secondary winding having a terminal in common with said primary winding and having a remaining terminal connected to the brush cooperating with said third mentioned slip ring, one of said first mentioned slip rings being electrically connected to one of the conducting segments of said commutator and the third mentioned slip ring being electrically connected to the other of the conducting segments of said commutator, and the brushes cooperating with said commutator serving as the direct current high voltage terminals of said device.

RICHARD DIETZE.